United States Patent
Marolia

(10) Patent No.: US 9,355,122 B1
(45) Date of Patent: May 31, 2016

(54) FILTERING APPLICATIONS USING RUNTIME INSPECTION

(71) Applicant: Amazon Technologies, Inc., Reno, NV (US)

(72) Inventor: Faizaan Kersi Marolia, Mumbai (IN)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 14/272,278

(22) Filed: May 7, 2014

(51) Int. Cl.
*G06F 17/30* (2006.01)

(52) U.S. Cl.
CPC ................ *G06F 17/30247* (2013.01)

(58) Field of Classification Search
CPC ................ G06F 17/00; G06F 17/30
USPC ................ 707/600–899
See application file for complete search history.

(56) References Cited

U.S. PATENT DOCUMENTS

2014/0189576 A1* 7/2014 Carmi ............... G06F 3/0481 715/781

OTHER PUBLICATIONS

Web article: "Image Segmentation" published by Wikipedia, 2014 [online][retrieved on May 7, 2014] retrieved from: http://en.wikipedia.org/wiki/Image_segmentation , 13 pps.

* cited by examiner

*Primary Examiner* — Isaac M Woo
(74) *Attorney, Agent, or Firm* — Lee & Hayes, PLLC

(57) ABSTRACT

Functionality is disclosed herein for determining whether an application is a resolution-compatible application or a resolution-incompatible application. An application is launched. One or more screenshots are taken while the application is launching or running. The one or more screenshots are broken into different regions that are then classified as blurry regions or non-blurry regions. The screenshot is determined to be blurry or non-blurry based on the classifications of the different regions as blurry regions or non-blurry regions. The application may then be classified as being a resolution-compatible application or a resolution-incompatible application based upon whether the screenshot is determined to be blurry or non-blurry.

20 Claims, 8 Drawing Sheets

FILTERING APPLICATIONS USING RUNTIME INSPECTION

BACKGROUND

Applications are developed for a variety of different types of computing devices. For example, an application may be developed for a smart phone, a tablet, or some other type of computing device. These different types of computing devices may have different native screen resolutions. Some computing devices have higher screen resolutions while other computing devices have lower screen resolutions.

Applications that look good to a user on one computing device do not always look good to the user on another computing device that has a higher screen resolution. For example, an application that is developed for a smart phone that has a lower screen resolution may not look very good when the application is run on a tablet having a higher screen resolution.

In order to address this issue, the displayed output of an application may be "stretched" to fit the higher screen resolution. Stretching the displayed output of the application to fill a screen having a higher screen resolution may result in a display that does not look very good to a user. For example, the displayed output may be blurry or include other types of undesirable artifacts.

In some cases, the displayed output of an application may not even fill the entire screen when executing on a computing device having a higher screen resolution. For example, the application may use just a portion of the screen. The portion of the screen that is not used by the application may, therefore, be empty or filled with a background image. This arrangement may be visually unappealing or even confusing to a user.

Determining if an application supports different resolutions can, however, be difficult. For example, certain mechanisms, such as static program analysis, may be unable to reliably determine whether an application provides non-blurry output a specific resolution.

The disclosure made herein is presented with respect to these and other considerations.

DETAILED DESCRIPTION

Figure 1:
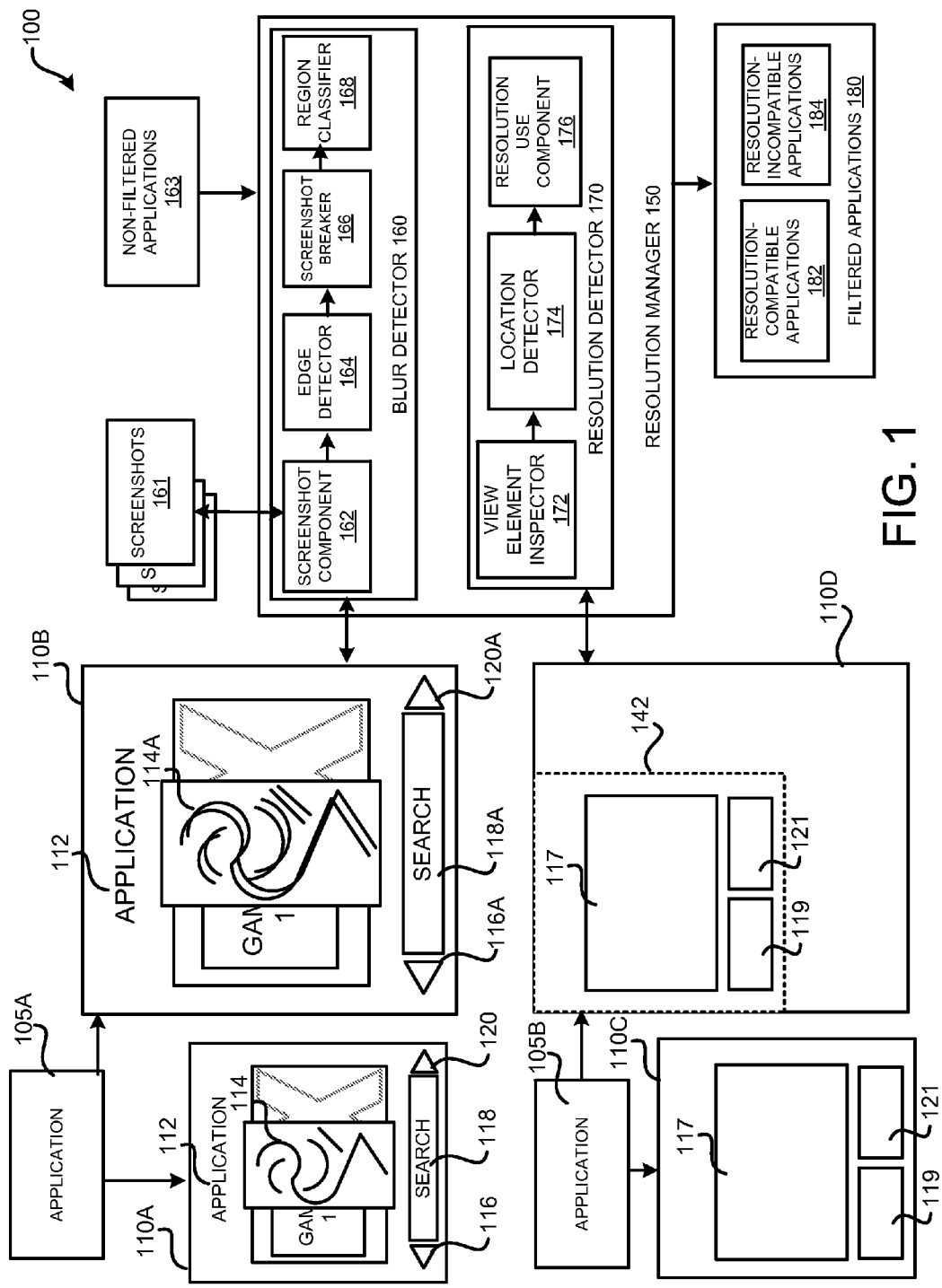
FIG. 1 illustrates a system for filtering applications using runtime inspection of the display characteristics of the applications.

The following detailed description is directed to technologies for filtering applications using runtime inspection of the display characteristics of the applications. Utilizing the technologies described herein, applications may be filtered into resolution-compatible applications and resolution-incompatible applications based upon determinations made utilizing information obtained while the applications are running. As used herein, the term "resolution-compatible application" refers to an application that is determined to support a specified resolution after performing a runtime inspection.

Different types of runtime inspections may be performed when determining if an application is a resolution-compatible application or a resolution-incompatible application. For example, a runtime inspection may determine if the displayed output (i.e., the displayed view elements) of an application is blurry at a specified resolution. A view element may be any type of output that is displayed by the application. For example, view elements may include, but are not limited to images, text, user interface elements, and the like. Another runtime inspection might also be performed to determine if the resolution that is used by application is the specified resolution of the display screen of the computing device upon which it is executing. For example, runtime inspections may be performed on an application to determine if the application supports a specified resolution of 1280×800, 1920×1200, 2560×1600, or some other specified resolution.

After launching the application, a determination is made as to whether the displayed output of the application at the specified resolution (e.g., 2560×1600) is blurry (i.e., unclear, fuzzy, out-of-focus) or non-blurry (i.e., sharp, in-focus). Generally, in order to make this determination, one or more screenshots are taken, the screenshots are broken into different regions and a determination is made as to whether each screenshot is blurry using a classification of the different regions as a blurry region or a non-blurry region. A blurry region is a region of a screenshot that is programmatically determined to appear blurry, fuzzy, out-of-focus, or otherwise unclear to a user. A non-blurry region is a region of a screenshot that is programmatically determined to appear clear, in-focus or otherwise sharp to the user. As discussed below, different image processing mechanisms may be used to classify a region of a screenshot as a blurry region or a non-blurry region.

In one example, the screenshot is broken into different regions based on shapes in the screenshot that are determined using edges detected in the screenshot. For example, a region may be created for each shape in the screenshot as defined by the detected edges. As another example, a region may be created for more than one shape in the screenshot. In one example, a mean and a standard deviation might also be computed for each of the edges in the different regions that is used in classifying each of the different regions as a blurry region or a non-blurry region. A small standard deviation indicates that the region is a blurry region whereas a larger standard deviation indicates that the region is a non-blurry region.

After classifying each of the regions as a blurry region or a non-blurry region, the screenshot is classified as a blurry screenshot or a non-blurry screenshot. Different methods may be used to determine if the screenshot is blurry. In one example, the screenshot is considered blurry if a total area of the regions that are classified as blurry exceed a predetermined area (e.g., 20%, 25% or some other value) of the combined area of the blurry regions and non-blurry regions of the screenshot. In one example, when one or more of the screenshots from the application are determined to be blurry, the application is classified as a resolution-incompatible application.

A runtime inspection of the application might also be performed to determine if the displayed output of the application uses the specified resolution. In some cases, an application may not use the entirety of the specified resolution. For example, an application may use just a 1280×1024 portion of the screen even though the native screen resolution is 2560× 1600.

In order to determine if the application uses the specified resolution, the location of the displayed view elements of the application on the screen are determined. When the view elements of the application are determined to use the specified resolution when they are displayed, then the application is determined to use the specified resolution. The application is classified as a resolution-incompatible application when it does not use the specified resolution.

In one example, the screenshots might include a screenshot of a "splash screen" that is displayed while the application is loading and other screenshots that are obtained while the application is running. A splash screen might include images, animations, as well as other graphical elements. The other screenshots might be taken in response to a specified functionality being performed by the application or at different times while the application is running. For example, a screenshot may be obtained after a UI element of the application is selected, when an image is displayed by the application, every 30 seconds while the application is running, and the like. The screenshots might be obtained without receiving user interaction. For example, a screenshot may be taken at predetermined times and/or in response to other events (e.g., programmatically selecting a UI view element). In another example, screenshots may be taken in response to receiving user input.

The runtime inspections described above may be performed on one or more applications. For example, the runtime inspections may be performed on all or a portion of the applications that are in an application catalog utilized by an online application store. Additional details regarding the various components and processes described above for performing runtime inspections of applications will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 illustrates a system 100 showing aspects of one illustrative mechanism described herein for filtering applications using runtime inspection of the display characteristics of the applications. The various mechanisms disclosed herein may operate within many different types of computing resources and various types of networks.

As shown in FIG. 1, system 100 includes the application 105A-105B, screens 110A-110D, resolution manager 150, screenshots 161, non-filtered applications 163 and filtered applications 180. The example screens 110A-110D of the applications 105A and 105B, respectively, are for illustrative purposes and are not intended to be limiting. In the example shown in FIG. 1, the screens 110A and 110C have a lower screen resolution as compared to the resolution of screens 110B and 110D.

As discussed briefly above, runtime inspections are performed on applications to determine whether the applications support a specified resolution. According to an embodiment, the runtime inspections include determining whether the displayed output of the application is blurry at a specified resolution and whether the application uses the specified resolution.

Resolution manager 150 is configured to perform runtime inspections of the display characteristics for applications. According to embodiments, resolution manager 150 performs runtime inspections with and/or without receiving user interactions. The resolution manager 150 may perform runtime inspections on one or more applications. For example, resolution manager 150 may test one or more non-filtered applications 163. Non-filtered applications 163 are applications that may or may not have not had runtime inspections performed at a specified resolution.

After the runtime inspections are performed on an application, the resolution manager 150 classifies the application as a resolution-compatible application or a resolution-incompatible application. Metadata that indicates whether an application is a resolution-compatible application or a resolution-incompatible application may be associated with the classified application. Applications that have been tested may be stored in a same data store as before classification (e.g., non-filtered applications 163) or may be stored at another suitable location (e.g., filtered applications 180). According to an embodiment, applications classified as resolution-compatible applications are stored in a location specified for storing resolution-compatible applications 182. Applications that have been classified as resolution-incompatible applications are stored in a location specified for storing resolution-incompatible applications 184. According to another embodiment, applications that are classified as either resolution-incompatible applications or resolution-compatible applications are stored in the same location.

As illustrated in FIG. 1, screen 110A shows the displayed view elements of an application 105A at a particular point in time while application 105A is running. The view elements include an application name 112, icon 114, a left arrow selector 116, a right arrow selector 120 and a search box 118. The resolution of screen 110A may be one of a variety of different resolutions. For example, the resolution of screen 110A may be 320×480, 480×720, 480×800, 640×960, 1024×600, 1280×800, 1920×1200, and the like.

For illustrative purposes, the displayed output of application 105A is presented both on screen 110A and on screen 110B. Screen 110A has a lower native screen resolution as compared to the native screen resolution of screen 110B. According to an embodiment, runtime inspections are performed on applications using a highest supported screen resolution of a computing device that is configured to run the applications. For example, when the supported screen resolutions range from 320×480 to 2560×1600, then the runtime manager 150 performs the runtime inspections using the 2560×1600 resolution.

Runtime inspections for applications might, however, be performed at different resolutions. For example, runtime inspections may be performed using all or a portion of the different resolutions. Generally, testing an application at a highest supported resolution also determines if the application displays view elements properly at lower resolutions. The examples described below with regard to FIG. 1 assume that the highest supported screen resolution is 2560×1600 and that screen 110B has a native screen resolution of 2560×1600.

Referring to screen 110A it can be seen that the displayed view elements of application 105A are clear or "sharp." In contrast, referring to the displayed view elements of application 105A on screen 110B it can be seen that one view element (icon 114A) appears blurry while the text (e.g., application 112A) and the other view elements (e.g., left arrow 116A, search box 118A, right arrow 120A) are clearly shown and non-blurry.

Application 105B displays view elements on screen 110C and screen 110D. Similar to the native screen resolutions of screens 110A and screen 110B, the native screen resolution of screen 110C is lower as compared to the native screen resolution of screen 110D. The displayed view elements of application 105B include an image 117 and two user interface (UI) view elements including UI view element 119 and UI view element 121. As can be seen in FIG. 1, image 117, UI view element 119 and UI view element 121 use a large portion of the resolution of screen 110C but only use a limited portion of the resolution of screen 110D that has a higher native screen resolution.

The operation of resolution manager 150 that includes blur detector 160 and resolution detector 170 will now be briefly described. More detailed information with regard to performing runtime inspections is provided below with respect to FIGS. 4-7. Generally, blur detector 160 is configured to determine when the output of an application is blurry when executed at a specified resolution. Resolution detector 170 is configured to determine when the displayed output of an application uses the specified resolution.

Resolution manager 150 selects an application, such as application 105A, from non-filtered applications 163 or some other location. After selecting the application, resolution manager 150 launches the application. In one example, the application is launched on a screen that is at the specified resolution. As illustrated, resolution manager 150 launches application 105A and uses screen 110B that is at the specified resolution.

Blur detector 160 is configured to obtain one or more screenshots 161. The screenshots 161 might be taken by screenshot component 162 while the application 105A is launching or while the application 105A is running. The screenshots 161 may be taken at various points. For example, as briefly discussed above, a screenshot may be taken at a "home" or "splash" screen while the application 105A is being launched. Other screenshots might be taken in response to a specified functionality being performed by the application or at different times while the application 105A is running. For example, a screenshot may be obtained after a UI element of the application 105A is selected, when an image is displayed by the application 105A, at predetermined times while the application 105A is running, and the like. The screenshots 161 might be obtained without receiving user interaction.

According to an embodiment, the screenshots 161 are taken by screenshot component 162 without receiving user interaction. For example, a screenshot may be taken by screenshot component 162 at predetermined times and/or in response to other events (e.g., programmatically selecting a UI view element). According to another embodiment, one or more of the screenshots may be taken in response to receiving user input.

After obtaining the screenshots using screenshot component 162, edge detector 164 identifies the edges present in one or more of the screenshots. Different methods may be used to perform edge detection. For example, edge detection methods include, but are not limited to Canny edge detection, Canny-Deriche edge detection, Sobel edge detection, Prewitt edge detection, Differential edge detection, and the like. Generally, an edge detector identifies the edges that are contained within a digital image, such as a screenshot.

Screenshot breaker 166 breaks each of the screenshots into different regions. Generally, each region relates to a different portion of the screenshot that includes a detected edge. According to an embodiment, the regions are created based on shapes in the screenshot that are determined from the detected edges. The regions may be uniform or non-uniform in size. More details regarding breaking the screenshot into regions are provided below. Generally, each different region in the screenshot includes one or more common edges.

In the current example, left arrow 116A may be a region, search box 118A may be a region, right arrow 120A may be a region, icon 114A may be a single region or combined with the other view elements, and the like. After breaking the screenshot into regions using screenshot breaker 166, region classifier 168 classifies each regions as a blurry region or a non-blurry region.

Different operations may be performed by region classifier 168 to determine if a region is blurry. For example, a Fast Fourier Transform (FFT) operation may be performed, a Laplace (or LoG) filter may be used, and the like. According to an embodiment, region classifier 168 determines the mean and standard deviation for one or more edges of a region. Region classifier 168 then uses the standard deviation to classify the region as a blurry region or a non-blurry region.

Generally, the standard deviation (SD) indicates the variation or dispersion from a mean value. In the current example, the mean and standard deviation are determined using a color of pixels in the screenshot that are associated with an edge and are near a detected edge (e.g., 2, 3, 4, 5 pixels away from the edge). A low standard deviation indicates that the data points tend to be very close to the mean value and a high standard deviation indicates that the data points are spread out over a large range of values. According to an embodiment, a low standard deviation in the region indicates that the region is blurry. A high standard deviation indicates that the region is non-blurry. According to an embodiment, region classifier 168 compares the standard deviation to a predetermined threshold value to determine if the region is to be classified as a blurry region or a non-blurry region.

After region classifier 168 classifies each region as a blurry region or a non-blurry region, blur detector 160 determines if the entire screenshot is determined to be blurry. Different methods may be used to determine when the screenshot is blurry. According to an embodiment, the screenshot is determined to be blurry by blur detector 160 when an area of the regions that are classified as blurry exceed a predetermined threshold. For example, blur detector 160 determines that the screenshot is blurry when the area of the regions that are classified as blurry exceeds twenty percent of the combined area of the blurry regions and the non-blurry regions for the screenshot. Other percentages may be used as the predetermined threshold (e.g., fifteen percent, twenty percent, twenty five percent).

According to an embodiment, the percentage for the predetermined threshold is user configurable. Blur detector 160 may perform these operations for one or more of the screenshots 161 that are obtained from the running application. According to an embodiment, when one of the screenshots is determined to be blurry, the application is classified as a resolution-incompatible application. When none of the screenshots is determined to be blurry, the application is determined to be a resolution-compatible application. According to another embodiment, the application is determined to be a resolution-compatible application when a predetermined number (e.g., 70%, 80%, 90%) of the screenshots are determined to be non-blurry screenshots.

Resolution manager 150 may also include resolution detector 170 that is configured to determine if applications, such as the applications 105A-105B, use the specified resolution. In the current example, application 105A uses the entire native resolution of screen 110B, but application 105B does not use the native resolution of screen 110D. As can be seen, the displayed output of application 105B is located in the upper left hand portion of screen 110D as indicated by dashed line 142.

In order to determine if the resolution used by an application is the specified resolution, resolution detector 170 uses view element inspector 172 to determine the view elements that are used by application 105B. As discussed above, the view elements may be any type of output that is displayed such as text, images, UI view elements, and the like.

Location detector 174 determines the location of the view elements. Location detector 174 may determine the location of view elements at one or more points during the operation of application 105B. For example, at one point in time a view element may be identified by location detector 174 as being located near the top edge of the screen 110D and at another point in time, a view element may be identified by location detector 174 as being located at a different location on screen 110D. In the current example, the view elements of application 105B are not displayed below the bottom line of box 142.

Resolution use component 176 determines when the view elements use the specified resolution of screen 110D. For example, if view elements are displayed near (e.g., within 10-30 pixels or some predetermined value) the bottom edge and the right edge of a screen at some point while the application is running, resolution use component 176 determines that the application uses the specified resolution. In the current example, resolution use component 176 determines that application 105B does not use the specified resolution of screen 110D. Instead, application 105B uses a different resolution as compared to the specified resolution. According to an embodiment, when an application uses a resolution other than the specified resolution, the application is classified by resolution detector 150 as a resolution-incompatible application.

Different operations may be performed based on the classification of an application as a resolution-compatible application or a resolution-incompatible application. According to an embodiment, resolution-compatible applications are identified by an online service. For example, the resolution-compatible applications may be displayed before resolution-incompatible applications. According to another embodiment, the resolution-compatible applications may be identified in a catalog listing as being resolution-compatible applications. As another example, only applications supporting the native resolution of a device might be presented in an application store to users of that device. More details regarding the runtime inspection of the display characteristics of applications are described below.

Figure 2:
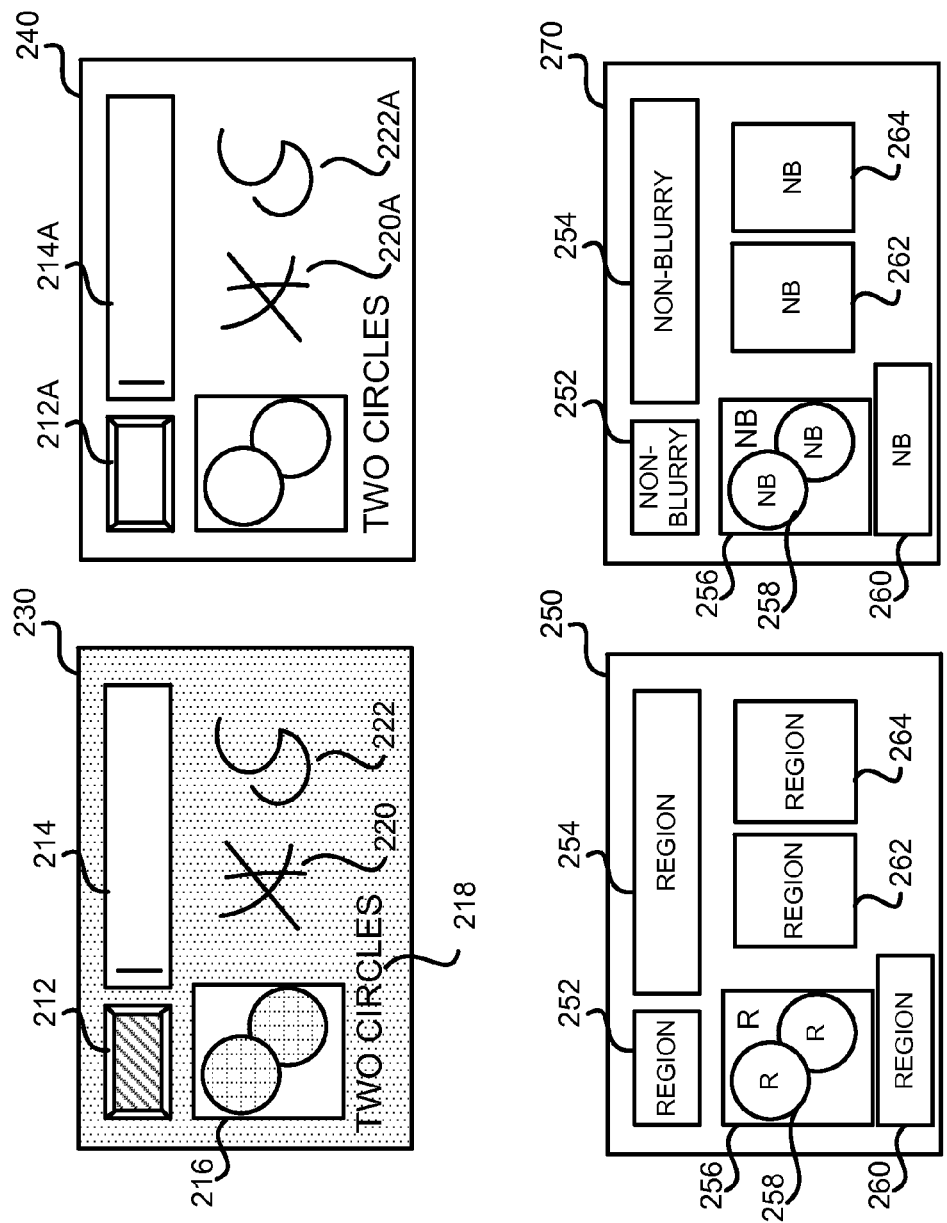
FIG. 2 is a diagram illustrating processing a screenshot to determine if the screenshot is blurry.

FIG. 2 illustrates the processing of a screenshot to determine if the screenshot is blurry. In particular, screenshot 230 is a screenshot from an application, such as an application in non-filtered applications 163 illustrated in FIG. 1. Screenshot 230 shows view elements including a UI view element 212, search box 214, image 216 that shows two circles in a square, text element 218 "Two Circles", image 220 and image 222. In the current example, screenshot 230 is a screenshot that is taken on a high-resolution screen (e.g., 1024×600 or higher).

Processed screenshot 240 represents the screenshot 230 after edge detection has been performed. As discussed above, different methods may be used to perform edge detection on a screenshot. According to an embodiment, the detected edges are used to break the screenshot into different regions.

Processed screenshot 250 illustrates the screenshot 230 following the breaking of the screenshot 230 into different regions by screenshot breaker 166, described above, using the detected edges. As briefly discussed, the regions may be uniform, non-uniform or some combination of uniform and non-uniform regions. For example, uniform regions may include regions in the form of rectangles, squares, circles, ovals, and the like. Non-uniform regions may be identified using some other method (e.g., mathematical formula, points in the screenshot).

As illustrated, the processed screenshot 250 shows region 252, region 254, region 256, region 258, region 260, region 262 and region 264. Screenshot 230 may be broken into more or fewer regions. A screenshot may be broken into regions using different methods. For example, the regions may be based on a grouping of common edges (e.g., the edges making up a shape), the grouping of a group of shapes (e.g., region 256), or some other method. A screenshot may also be broken into regions based on a type of shape that is associated with an edge. For example, text view elements may be combined to form a region, UI view elements may be combined to form a region, image view elements may be combined to form a region, each image view element may be its own region, and the like.

The processed screenshot 270 illustrates the screenshot 230 following a determination as to whether or not the detected regions are blurry regions or non-blurry regions as determined by resolution manager 150 as illustrated in FIG. 1. In the example illustrated in FIG. 2, each of the regions have been classified as non-blurry (which may be indicated in FIG. 2 by the text "non-blurry" or "NB").

Figure 3:
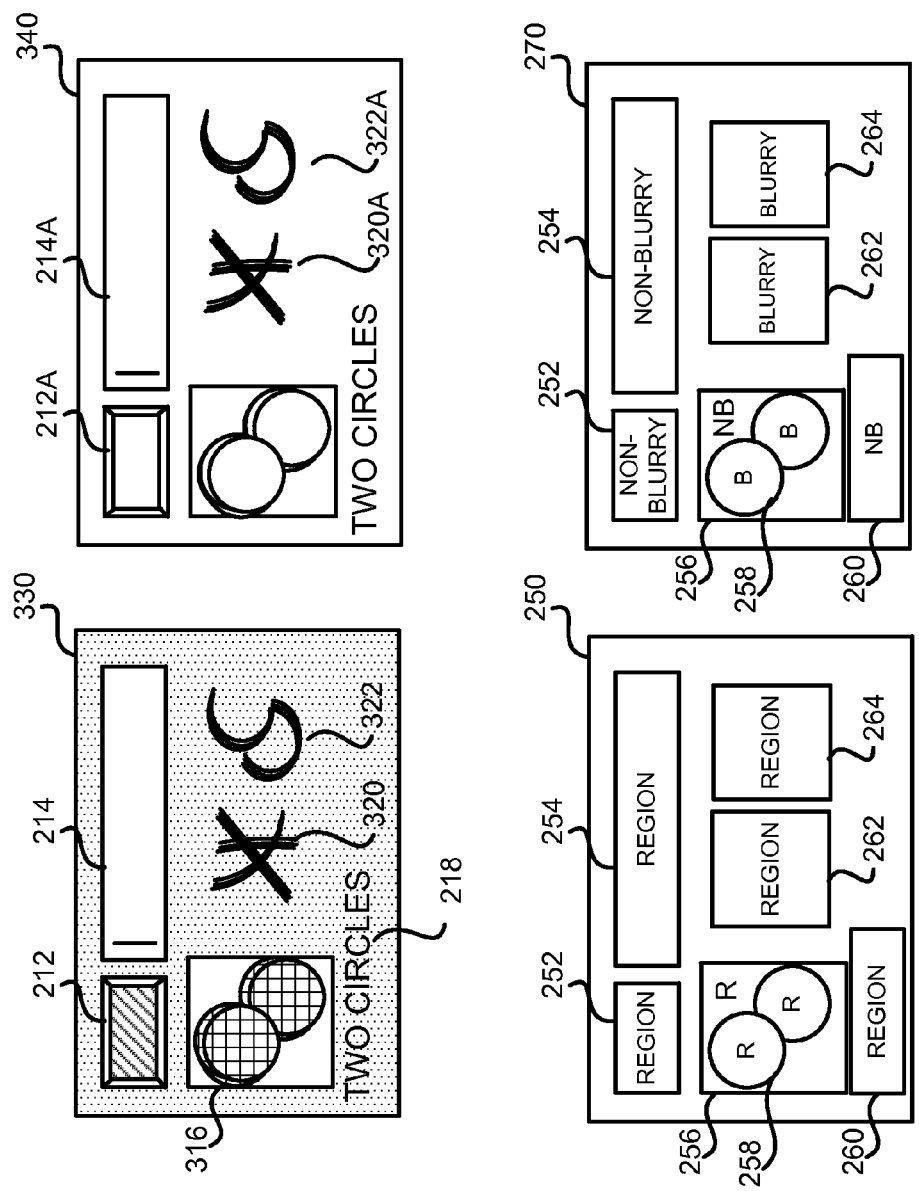
FIG. 3 is a diagram illustrating processing a screenshot that includes regions that are determined to be blurry.

FIG. 3 illustrates the processing of a screenshot that includes regions that are determined to be blurry. In particular, the screenshot 330 is a screenshot from an application, such as from an application in non-filtered applications 163 as shown in FIG. 1. The screenshot 330 is similar to screenshot 230 that is illustrated in FIG. 2, but includes regions that are determined to be blurry. For example, the screenshot 330 may be a screenshot from the same application as in FIG. 2, but taken when the application presents its output on a display screen having a higher screen resolution. Screenshot 330 shows a UI view element 212, search box 214, image 316 that shows circles in a square, text element 218 that reads "Two Circles", image 320 and image 322.

The processed screenshot 340 represents the screenshot 330 after edge detection has been performed. As can be seen by referring to processed screenshot 340, image 320 and image 322 are blurry as compared to image 220 and image 222 illustrated in FIG. 2. The processed screenshot 250 represents the screenshot 330 after the screenshot 330 has been broken into different regions. Processed screenshot 250 illustrates the same regions as illustrated in FIG. 2.

The processed screenshot 270 illustrates the classification of the detection regions as blurry or non-blurry. As discussed above, region classifier 168 illustrated in FIG. 1 classifies each of the different regions as blurry or non-blurry. In the example illustrated in FIG. 3, some of the regions of screenshot 330 have been determined to be blurry regions. The regions determined to be blurry regions include region 258, region 262 and region 264 (shown in processed screenshot 270).

According to an embodiment, the screenshot 330 would be determined to be blurry since the area of the regions that are classified as blurry regions exceed a predetermined threshold (e.g., 10%, 20%) of the combined area for the blurry regions and non-blurry regions. Other determinations might also be utilized. For example, and without limitation, different regions may be weighted differently. According to an embodiment, regions containing certain types of view elements, such as images, are weighted more than text elements or selector elements (e.g., buttons). For example, text elements and button elements typically scale better than images (e.g., bitmaps). More details regarding the runtime inspection of the display characteristics of applications are described below.

FIGS. 4-7 are flow diagrams showing routines relating to runtime inspection of the display characteristics of applications, according to one embodiment disclosed herein. It should be appreciated that the logical operations described herein with respect to FIGS. 4-7, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

Figure 4:
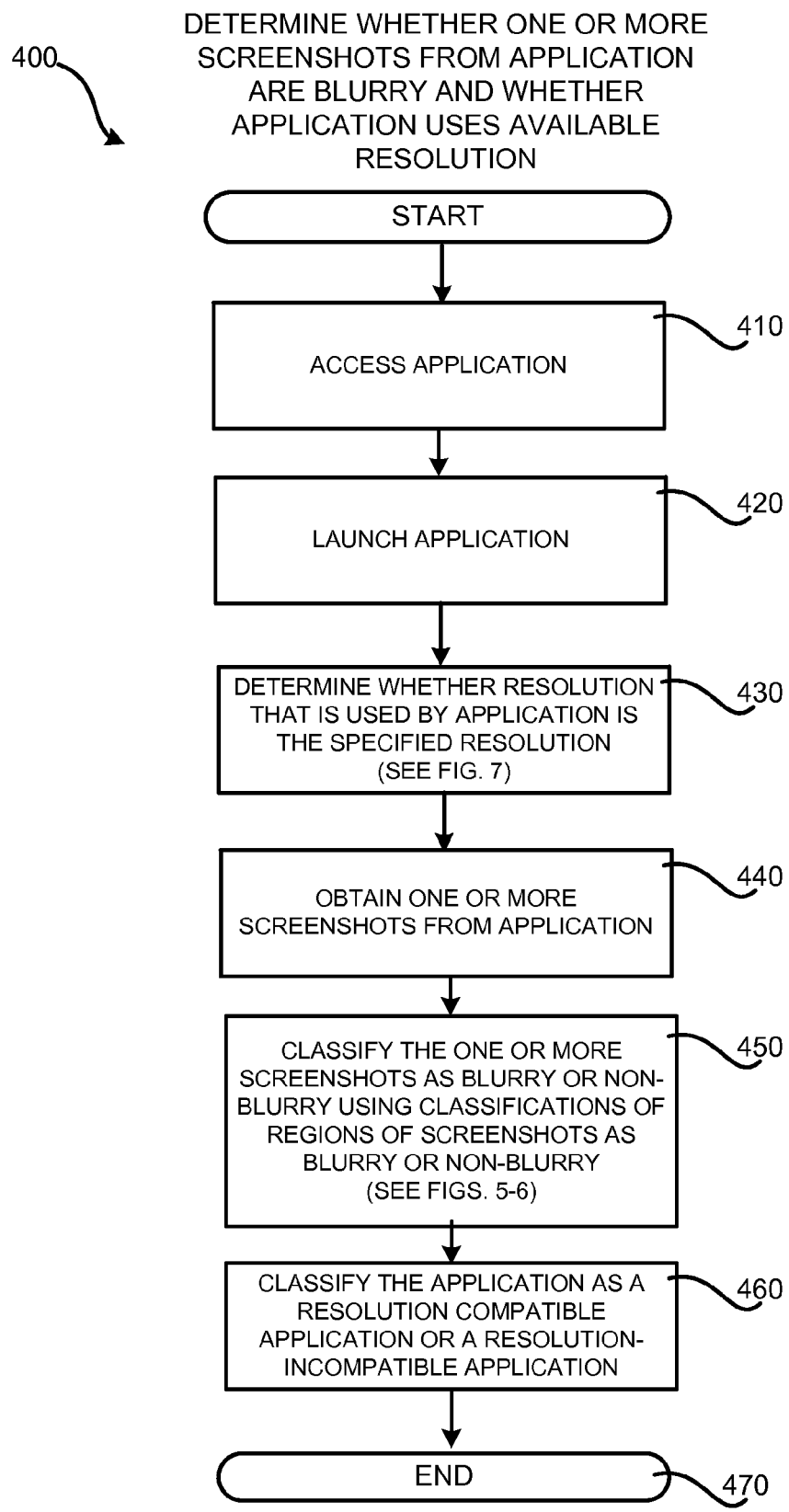
FIG. 4 illustrates an overview routine for determining whether an application is a resolution-compatible application.

FIG. 4 is a flow diagram showing a routine 400 that illustrates aspects of one mechanism disclosed herein for determining whether an application is a resolution-compatible application. Routine 400 begins at operation 410, where an application is accessed. The application may be one of many different types of applications that is configured to run on one or more types of computing devices. For example, the application may be an application for a mobile computing device such as a phone, a tablet, a laptop or a desktop computing device.

According to an embodiment, the applications are configured to run on mobile computing devices such as smartphones and tablets. In this regard, it should be appreciated that the applications might be capable of executing on different types of computing devices with different screen resolutions, such as smartphone computing devices and tablet computing devices and/or different versions of the same computing device that support different resolutions (e.g. different generations of a smartphone or tablet computing device). The application may be accessed from a data store or memory (e.g., non-filtered applications 163) that is on the device or that is external from the device (e.g., a network data store). According to an embodiment, the accessed applications are part of an application catalog utilized in conjunction with an application store.

From operation 410, routine 400 proceeds to operation 420, where the application is executed. The application is launched on a computing device that includes a screen that is at a specified resolution. According to an embodiment, the specified resolution is a highest supported resolution that is used by one or more different computing devices (e.g., 2560× 1600) that is running the applications on which runtime inspections are being performed. As discussed above, the runtime inspections may be performed on the application at one or more specified resolutions.

From operation 420, routine 400 proceeds to operation 430, where a determination is made as to whether the resolution that is used by the application is the specified resolution. Generally, if an application displays view elements near the different edges of the screen at the specified resolution then the application is determined to use the specified resolution. In other words, the application uses the specified resolution when view elements are displayed throughout the specified resolution. More details regarding determining if the resolution used by the application is the specified resolution are described below with regard to FIG. 7.

From operation 430, the routine 400 proceeds to operation 440, where one or more screenshots are obtained from the application that was launched at operation 420. In one example, the screenshots may be obtained while the application is being launched and/or while the application is running According to an embodiment, the screenshots are taken and obtained at different points while the application is launching and running without receiving user input. For example, a program may be configured to take screenshots at one or more points before the application is running (e.g., while the application is loading) and while the application is running According to another embodiment, all or a portion of the screenshots may be manually taken by a user. For example, a user may select a print screen command to take a screenshot.

From operation 440, the routine 400 proceeds to operation 450, where the one or more screenshots are classified as blurry or non-blurry using classifications of different regions of the screenshots as being blurry regions or non-blurry regions. As discussed above, instead of determining if an entire screenshot is blurry by performing an operation across the entire screenshot, the screenshot is broken into different regions.

After breaking the screenshot into different regions, each of the different regions is classified as a blurry region or a non-blurry region. More details regarding the mechanisms presented herein for breaking the screenshot into different regions and determining whether a region is blurry and a screenshot is blurry are described below with regard to FIGS. 5 and 6.

From operation 450, the routine 400 proceeds to operation 460, where the application is classified as a resolution-compatible application or a resolution-incompatible application. Applications that are classified as a resolution-compatible application may be indicated to be a resolution-compatible application (e.g., using metadata associated with the application) and/or stored in one or more data stores. The routine 400 then proceeds to an end operation and returns to processing other operations. For example, from operation 460, routine 400 may proceed back to operation 410.

Figure 5:
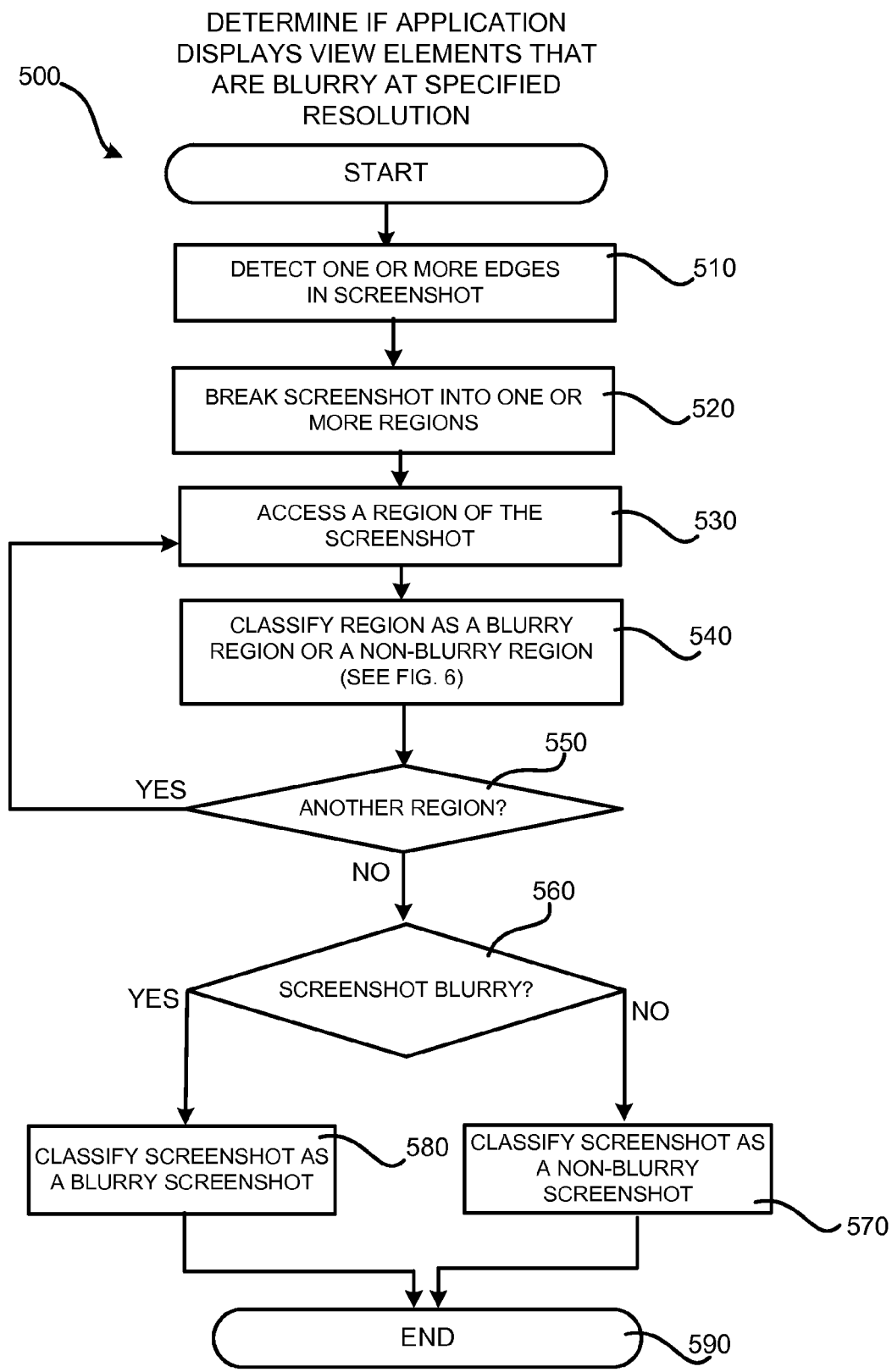
FIG. 5 shows a routine that determines if an application displays view elements that are blurry at a specified resolution.

FIG. 5 is a flow diagram showing a routine 500 that illustrates aspects of one mechanism disclosed herein for determining whether an application displays view elements that are blurry at a specified resolution. Routine 500 begins at operation 510, where edges in a screenshot are detected. As discussed above, different edge detection mechanisms may be used to identify the edges in a screenshot.

From operation 510, routine 500 proceeds to operation 520, where the screenshot is broken into regions based on the edges detected in operation 510. As discussed above, a separate region may be created for each separate shape or view element in the screenshot as determined by the detected edges (e.g., the common edges making up a shape) or using some other method. According to an embodiment, a region is created for each common set of edges that form a shape. From operation 520, the routine 500 proceeds to operation 530, where a region of the screenshot is selected for further processing. Generally, the different regions of the screenshot may be accessed in any order.

From operation 530, routine 500 proceeds to operation 540, where the selected region is classified as a blurry region or a non-blurry region. As discussed above, different mechanisms may be utilized to determine if a region is blurry. According to an embodiment, a mean and a standard deviation are computed for the edges in the region in the manner described above. When the standard deviation is below a predetermined threshold, then the region is considered to be a blurry region. More details regarding the mechanisms disclosed herein for determining whether a region is blurry are described below with regard to FIG. 6.

From operation 540, the routine 500 proceeds to operation 550, where a determination is made as to whether there is another region in the screenshot to process. When there is another region, routine 500 returns to operation 530. When there is not another region, routine 500 proceeds to operation 560.

At operation 560, a determination is made as to whether the screenshot is blurry. As discussed above, the screenshot may be determined to be blurry or non-blurry using different methods and/or thresholds. For example, a screenshot may be classified as blurry when a predetermined percentage of regions in the screenshot are classified as blurry regions. In another example, the screenshot may be determined to be blurry in response to a determination that the total area of the blurry regions in the screenshot exceed a predetermined threshold. A screenshot might also be determined to be non-blurry when the percentage of regions that are classified as blurry regions are below a predetermined threshold. According to another example, a screenshot may be determined to be non-blurry when the total area of regions that are classified as blurry regions are below a predetermined threshold.

When a screenshot is determined to be non-blurry, the routine 500 proceeds to operation 570, where the screenshot is classified as a non-blurry screenshot. When a screenshot is determined to blurry, the routine 500 proceeds from operation 560 to operation 580 where the screenshot is classified as a blurry screenshot.

The routine 500 proceeds from operations 570 and 580 to operation 590, where it ends. The process described above might be repeated in order determine if another application is a resolution-compatible application. For example, from operations 570 and 580, the routine 500 proceed in order to launch another application to determine whether the application is a resolution-compatible application.

Figure 6:
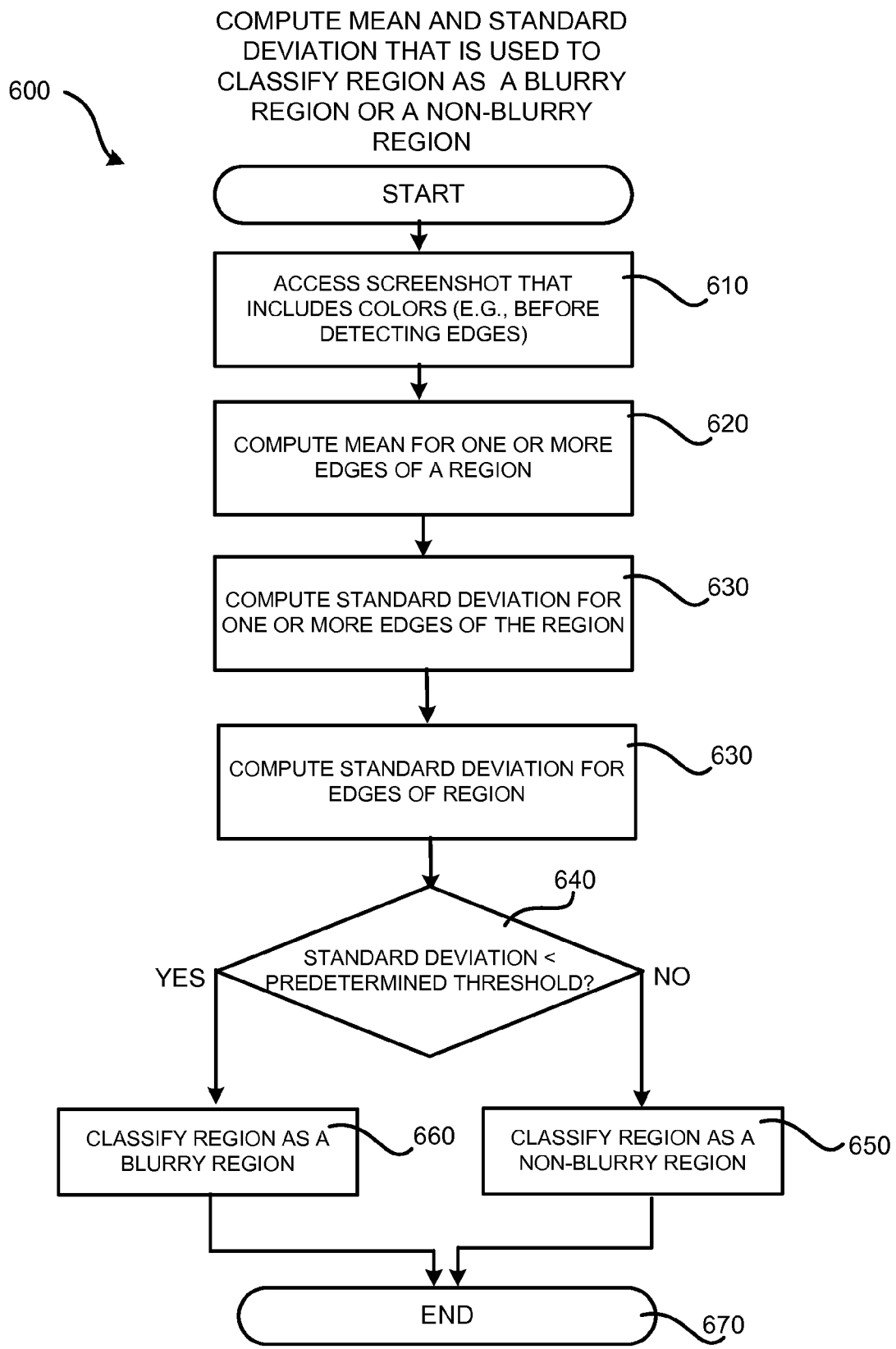
FIG. 6 illustrates a routine for determining if a region is blurry based on a computed mean and standard deviation for edges in the region.

FIG. 6 is a flow diagram showing a routine 600 that illustrates aspects of one mechanism presented herein for determining if a region in a screenshot is blurry based upon a computed mean and standard deviation for edges in the region. The routine 600 begins at operation 610, where the screenshot that includes the displayed colors is accessed. For example, the original screenshot is accessed such that the colors on an edge and near a determined edge may be obtained and used when computing the mean and standard deviation.

From operation 610, routine 600 proceeds to operation 620, where a mean for one or more of the edges in the region is computed. As discussed above, the mean includes the color of the pixels for the edge and the color of pixels that are a predetermined distance from the edges in the region. According to an embodiment, the mean color of each continuous edge and pixels near the edge (e.g., 2 pixels, 3 pixels, 4 pixels) is determined. According to another embodiment, the mean is determined from all of the edges in the region.

From operation 620, routine 600 proceeds to operation 630, where a standard deviation is computed for one or more edges in the region. As discussed above, the standard deviation may be calculated using the edge pixel colors and the color of pixels that are predetermined distance from the edges in the region. For example, the color of pixels that are 2 pixels, 3 pixels, 4 pixels may be used when obtaining the color of the pixels and computing the standard deviation.

From operation 630, routine 600 proceeds to decision operation 640, where a determination is made as to whether the standard deviation is less than a predetermined threshold. When the standard deviation is not below the predetermined threshold, routine flows to operation 650. When the standard deviation is below the predetermined threshold, routine flows to operation 660. As discussed above, the smaller the standard deviation, the more likely the region is blurry. Different predetermined threshold values may be used when classifying a region.

At operation 650, the region is classified as a non-blurry region in response to the standard deviation being not less than a predetermined threshold. At operation 660, the region is classified as a blurry region in response to determining that that standard deviation is less than the predetermined threshold. From operations 650 and 660, the routine 600 proceeds to operations 670, where it ends.

Figure 7:
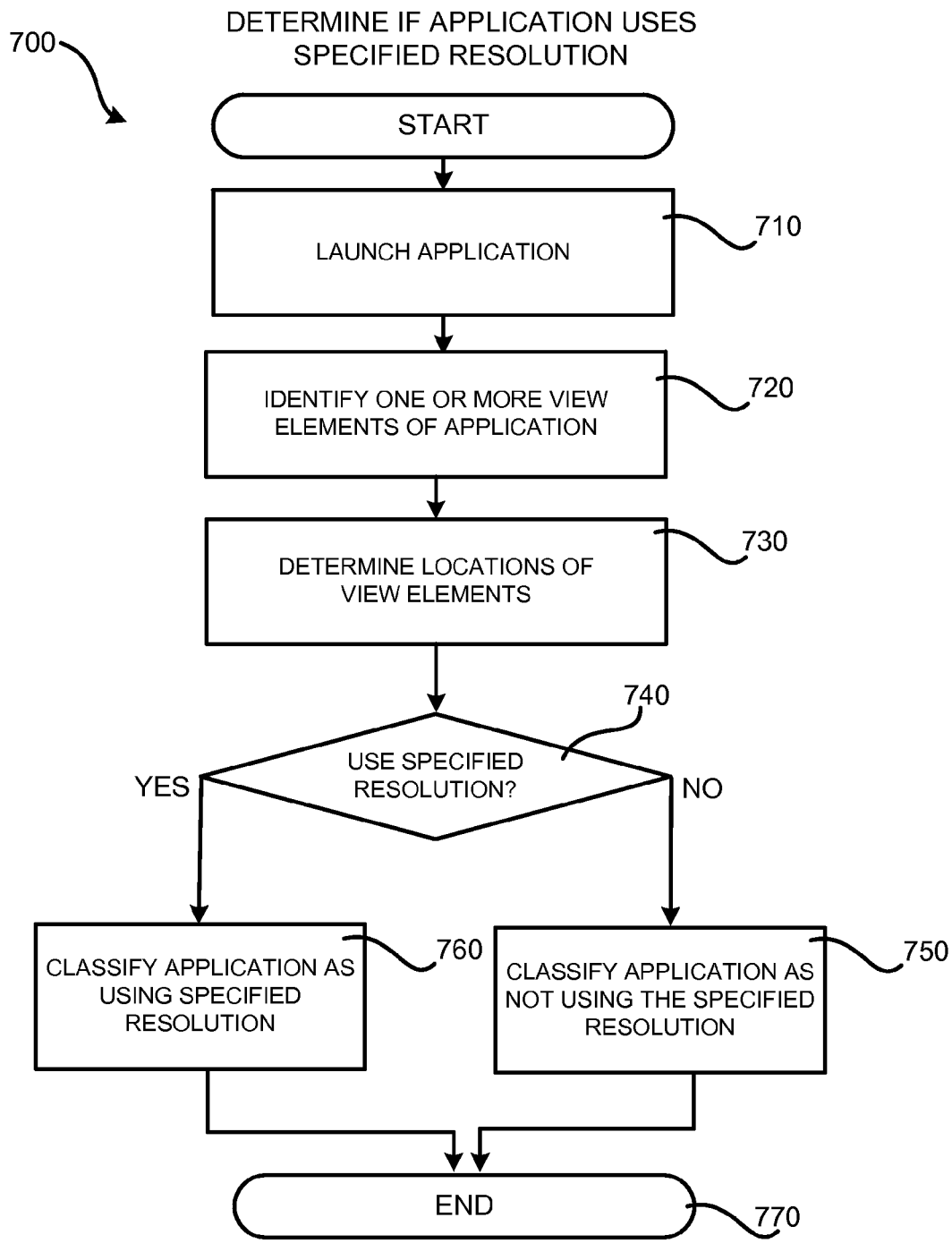
FIG. 7 illustrates a routine for determining whether a resolution that is used by the application is the specified resolution.

FIG. 7 is a flow diagram showing aspects of a routine 700 for determining whether the resolution used by an application is a specified resolution. The routine 700 begins at operation 710, where the application is launched. As discussed above, the application is launched on a device at the specified resolution.

From operation 710, routine 700 proceeds to operation 720, where the view elements of the application are identified. Generally, the view elements of the application that are identified are the view elements that are presented (i.e., displayed) by the application. For example, the view elements may include, but are not limited to buttons, check boxes, clocks, images, notifiers, labels, list pickers, text boxes, a canvas, and the like.

From operation 720, routine 700 proceeds to operation 730, where the location of the displayed view elements are determined. As discussed above, the locations of the different view elements may be determined from one or more outputs that are generated while running the application. For example, the locations of view elements may be determined from one or more displayed outputs of an application, such as a home screen or some other screen of an application.

According to an embodiment, the locations of the view elements are determined by using a program that selects different options from the UI of the application to determine the locations of the view elements that are displayed at different times by the application. For example, the program may select options with/without user input to display different view elements that are associated with the application.

From operation 730, routine 700 proceeds to decision operation 740, where a determination is made as to whether the resolution used by the application is the specified resolution. Generally, when one or more identified view elements are displayed near an edge of the screen (e.g., within some predetermined distance), the application is classified to use the specified resolution at operation 760. For example, when an identified view element is displayed near the bottom right location of a screen, then the application is classified to use the specified resolution.

When the resolution used by the application is not the specified resolution, routine 700 proceeds to operation 750, where the application is classified as not using the specified resolution. Generally, when an application does not use the specified resolution there will not be any view elements displayed below some location or to the right of some location on the screen. According to an embodiment, an application that is classified as not using the application is classified as a resolution-incompatible application. From operations 750 and 760, the routine 700 proceeds to operation 770, where it ends.

Figure 8:
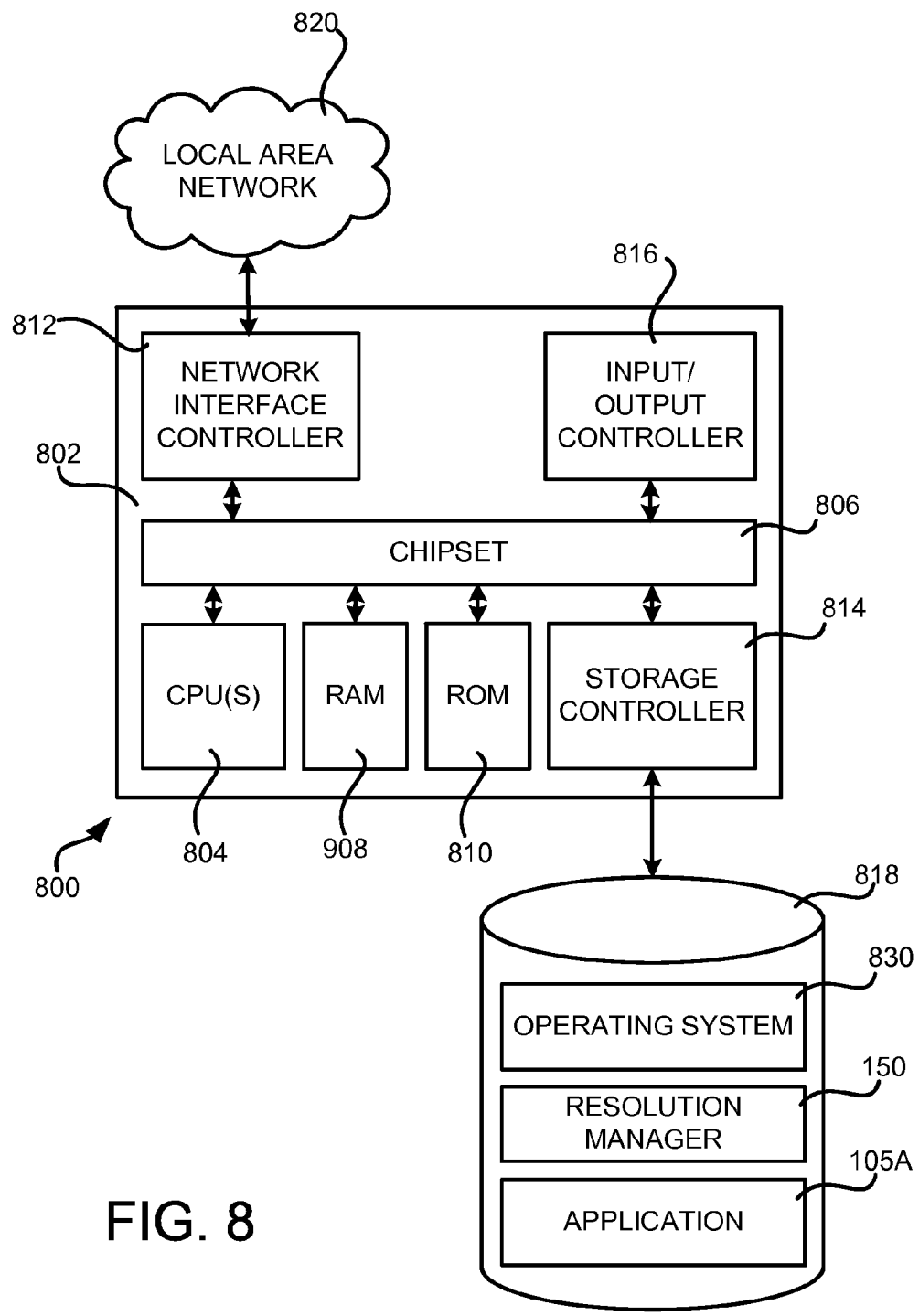
FIG. 8 is a computer architecture diagram showing one illustrative computer hardware architecture for implementing a computing device that might be utilized to implement aspects of the various embodiments presented herein.

FIG. 8 shows an example computer architecture for a computer 800 capable of executing program components relating to performing runtime inspections to determine if an application is a resolution-compatible application in the manner described above. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute software components for performing operations relating to performing runtime inspections as described above. The computer architecture shown in FIG. 8 might also be utilized to implement a customer computing system or other types of computing systems.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 820. The chipset 806 may include functionality for providing network connectivity through a NETWORK INTERFACE CONTROLLER (NIC) 812, such as a gigabit Ethernet adapter. The NIC 812 is capable of connecting the computer 800 to other computing devices over the local area network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800, such as resolution manager 150, application 105A and/or any of the other software components and data described above. The mass storage device 818 might also store other programs and data not specifically identified herein.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines described above with regard to FIGS. 4-7. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display or screen, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for performing runtime inspections to determine if an application is a resolution-compatible application have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for performing a runtime inspection to determine whether an application supports a specified resolution, the method comprising performing computer-implemented operations for:
   launching the application;
   determining a resolution used by the application;
   classifying the application as a resolution-incompatible application in response to determining that the resolution used by the application is other than the specified resolution;
   obtaining one or more screenshots from the application while the application is running and, for the one or more screenshots,
      breaking a screenshot into regions,
      classifying each of the regions as a blurry region or a non-blurry region,
      determining whether a total area of blurry regions exceed a predetermined threshold,
      in response to determining that the total area of the blurry regions exceeds the predetermined threshold, classifying the screenshot as blurry, and
      in response to determining that the total area of the blurry regions does not exceed the predetermined threshold, classifying the screenshot as non-blurry; and
   classifying the application as a resolution-compatible application in response to the one or more screenshots being classified as non-blurry and in response to determining that the resolution used by the application is the specified resolution.

2. The computer-implemented method of claim 1, wherein obtaining the one or more screenshots from the application while the application is running comprises obtaining the one or more screenshots from the application in response to receiving selections of different view elements that are presented by the application.

3. The computer-implemented method of claim 1, wherein breaking the screenshot into the regions comprises defining a region, the region including one or more shapes that are identified from one or more edges identified in the screenshot.

4. The computer-implemented method of claim 1, wherein classifying each of the regions as the blurry region or the non-blurry region comprises:
   computing a standard deviation for one or more edges in a region; and
   classifying the region as the blurry region in response to determining that the standard deviation is below a predetermined threshold.

5. The computer-implemented method of claim 1, wherein determining that the resolution used by the application is other than the specified resolution comprises using a location of one or more view elements that are presented by the application.

6. A non-transitory computer-readable storage medium having computer-executable instructions stored thereupon which, when executed by a computer, cause the computer to:
    launch an application;
    obtain a first screenshot from the application while the application is running;
    break the first screenshot into one or more regions based at least in part on edges detected in the first screenshot;
    classify each of the one or more regions as a blurry region or a non-blurry region;
    classify the first screenshot as a blurry screenshot or a non-blurry screenshot based at least in part on the classification of each of the one or more regions; and
    classify the application as a resolution-compatible application in response to the first screenshot being classified as the non-blurry screenshot.

7. The non-transitory computer-readable storage medium of claim 6, further comprising instructions to:
    inspect one or more view elements presented by the application; and
    determine, based at least in part on a location of the one or more view elements, that a resolution used by the application is a specified resolution.

8. The non-transitory computer-readable storage medium of claim 6, further comprising instructions to:
    obtain a second screenshot from the application of a splash screen that is presented by the application when the application is loading;
    break the second screenshot into one or more second screenshot regions;
    classify each of the one or more second screenshot regions as a second screenshot blurry region or a second screenshot non-blurry region;
    classify the second screenshot as a blurry second screenshot or a non-blurry second screenshot based at least in part on the classification of each of the one or more second screenshot regions; and
    classify the application as the resolution-compatible application in response to the first screenshot being classified as the non-blurry screenshot and the second screenshot being classified as the non-blurry second screenshot.

9. The non-transitory computer-readable storage medium of claim 6, further comprising instructions to classify the first screenshot as the blurry screenshot or the non-blurry screenshot based at least in part on a comparison of a total area of blurry regions to a predetermined threshold.

10. The non-transitory computer-readable storage medium of claim 6, further comprising instructions to locate one or more shapes in the first screenshot that are identified by one or more common edges detected in the first screenshot.

11. The non-transitory computer-readable storage medium of claim 6, further comprising instructions to:
    locate one or more shapes in the first screenshot that are identified by the edges; and
    utilize the located shapes to break the first screenshot into the one or more regions.

12. The non-transitory computer-readable storage medium of claim 6, further comprising instructions to:
    compute, for the one or more regions, a standard deviation for the edges using color values for pixels located on the edge and a predefined distance from the edges; and
    compare the standard deviation to a predetermined threshold to classify the region.

13. The non-transitory computer-readable storage medium of claim 6, further comprising instructions to determine that a resolution used by the application is a specified resolution based at least in part on a determination of locations of view elements presented by the application.

14. The non-transitory computer-readable storage medium of claim 6, further comprising instructions to determine whether a total area of blurry regions exceed a predetermined area of the first screenshot.

15. An apparatus for determining whether an application is a resolution-compatible application, the apparatus comprising:
    a processor; and
    a non-transitory computer-readable storage medium having computer-executable instructions stored thereupon which, when executed on the processor, cause the apparatus to
    launch the application,
    obtain one or more screenshots from the application and, for each of the one or more screenshots,
        break a screenshot into one or more regions,
        classify each of the one or more regions as a blurry region or a non-blurry region, and
        classify the screenshot as a blurry screenshot or a non-blurry screenshot based at least in part on the classification of each of the one or more regions, and
    classify the application as a resolution-compatible application in response to a predetermined number of the one or more screenshots being classified as the non-blurry screenshot.

16. The apparatus of claim 15, further comprising instructions to classify the application as a resolution-incompatible application in response to determining that a resolution used by the application is other than a specified resolution.

17. The apparatus of claim 15, wherein the one or more screenshots include at least one screenshot of a splash screen obtained from the application and screenshots obtained at different points in time while the application is running.

18. The apparatus of claim 15, further comprising instructions to compute a standard deviation for edges identified in each of the one or more regions.

19. The apparatus of claim 18, further comprising instructions to classify each of the one or more regions using a comparison of the standard deviation to a predetermined threshold.

20. The apparatus of claim 15, further comprising instructions to determine a location of one or more view elements and to determine that a resolution used by the application is a specified resolution based at least in part on the location of the one or more view elements.

* * * * *